US012614226B2

(12) United States Patent
Bender et al.

(10) Patent No.: US 12,614,226 B2
(45) Date of Patent: Apr. 28, 2026

(54) METHOD, MEDIUM, AND SYSTEM FOR A USER INTERFACE WITH SEARCH RESULTS LOGICALLY ORGANIZED BY CAROUSELS

(71) Applicant: Maplebear Inc., San Francisco, CA (US)

(72) Inventors: Jonathan Lennart Bender, San Francisco, CA (US); Kevin Lau, San Francisco, CA (US); Silas Burton, Brooklyn, NY (US); Prakash Putta, Seattle, WA (US); Manmeet Singh, Santa Clara, CA (US); Tejaswi Tenneti, Fremont, CA (US)

(73) Assignee: Maplebear Inc., San Francisco, CA (US)

( * ) Notice: Subject to any disclaimer, the term of this patent is extended or adjusted under 35 U.S.C. 154(b) by 462 days.

(21) Appl. No.: 17/871,790

(22) Filed: Jul. 22, 2022

(65) Prior Publication Data

US 2023/0289868 A1 Sep. 14, 2023

Related U.S. Application Data

(60) Provisional application No. 63/317,942, filed on Mar. 8, 2022.

(51) Int. Cl.
G06Q 30/0601 (2023.01)
G06F 3/0482 (2013.01)
(Continued)

(52) U.S. Cl.
CPC ....... G06Q 30/0643 (2013.01); G06F 16/906 (2019.01); G06F 16/9538 (2019.01);
(Continued)

(58) Field of Classification Search
CPC .......... G06Q 30/0643; G06Q 30/0641; G06Q 30/0601–0645; G06Q 30/06431;
(Continued)

(56) References Cited

U.S. PATENT DOCUMENTS 10,891,676 B1 * 1/2021 Kan .................. G06Q 30/0643
11,435,873 B1 * 9/2022 Sharma .............. G06F 16/9538
(Continued)

OTHER PUBLICATIONS

Kara Pernice, Carousel Usability: Designing an Effective UI for Websites with Content Overload, NNgroup, Sep. 14, 2013 (Year: 2013).*

(Continued)

*Primary Examiner* — Marissa Thein
*Assistant Examiner* — Anna Mae Mitros
(74) *Attorney, Agent, or Firm* — Fenwick & West LLP

(57) ABSTRACT

An online concierge system receives a search query from a client device. The online concierge system identifies a set of matching items from an item database. The matching items correspond to the received search query. The online concierge system obtains, from a hierarchical item taxonomy, a category label for each matching item. The item taxonomy relates each item in the item database to one of a plurality of category labels. The online concierge system groups the matching items by the category labels for each of the matching items into one or more groups. The online concierge system generates instructions for a user interface. The user interface includes a scrollable list of one or more carousels. Each carousel includes a scrollable list of a group of the one or more groups. The online concierge system sends the instructions of the user interface to the client device for display.

19 Claims, 6 Drawing Sheets

(51) Int. Cl.

| | |
|---|---|
| *G06F 3/0485* | (2022.01) |
| *G06F 16/906* | (2019.01) |
| *G06F 16/9538* | (2019.01) |
| *G06F 16/954* | (2019.01) |
| *G06N 5/022* | (2023.01) |

(52) U.S. Cl.

CPC ........... *G06F 16/954* (2019.01); *G06N 5/022* (2013.01); *G06Q 30/0641* (2013.01); *G06F 3/0482* (2013.01); *G06F 3/0485* (2013.01)

(58) Field of Classification Search

CPC ....... G06Q 30/06432; G06Q 30/06433; G06Q 30/06434; G06Q 30/06435; G06Q 30/0644; G06Q 30/06442; G06Q 30/06443; G06Q 30/06444; G06F 3/0482; G06F 3/0485; G06F 16/954; G06F 16/9538; G06F 16/906; G06N 5/022

USPC ................................................ 705/26.1–27.2

See application file for complete search history.

(56) References Cited

U.S. PATENT DOCUMENTS

| | | | | |
|---|---|---|---|---|
| 11,769,194 | B2 * | 9/2023 | Pande | ................ G06Q 30/0643 |
| | | | | 705/26.7 |
| 2007/0255745 | A1 * | 11/2007 | Gargi | ...................... G06F 16/58 |
| | | | | 707/999.102 |
| 2012/0296779 | A1 | 11/2012 | Ochiai | |
| 2015/0012381 | A1 | 1/2015 | Lazaro | |
| 2018/0150851 | A1 | 5/2018 | Ouimet | |
| 2019/0080207 | A1 | 3/2019 | Chang et al. | |
| 2020/0349634 | A1 * | 11/2020 | Ghamsari | .......... G06Q 30/0643 |
| 2021/0256548 | A1 * | 8/2021 | Heinonen | .......... G06Q 30/0269 |

OTHER PUBLICATIONS

PCT International Search Report and Written Opinion, PCT Application No. PCT/US2022/052751, Mar. 10, 2023, nine pages.

* cited by examiner

100

500

505

Dairy

Top Results

W    B

510

View More

515

Milk

520

W   2   1   S

525

530

Yogurt

View More

A   B   C   D

Cheese

View More

535

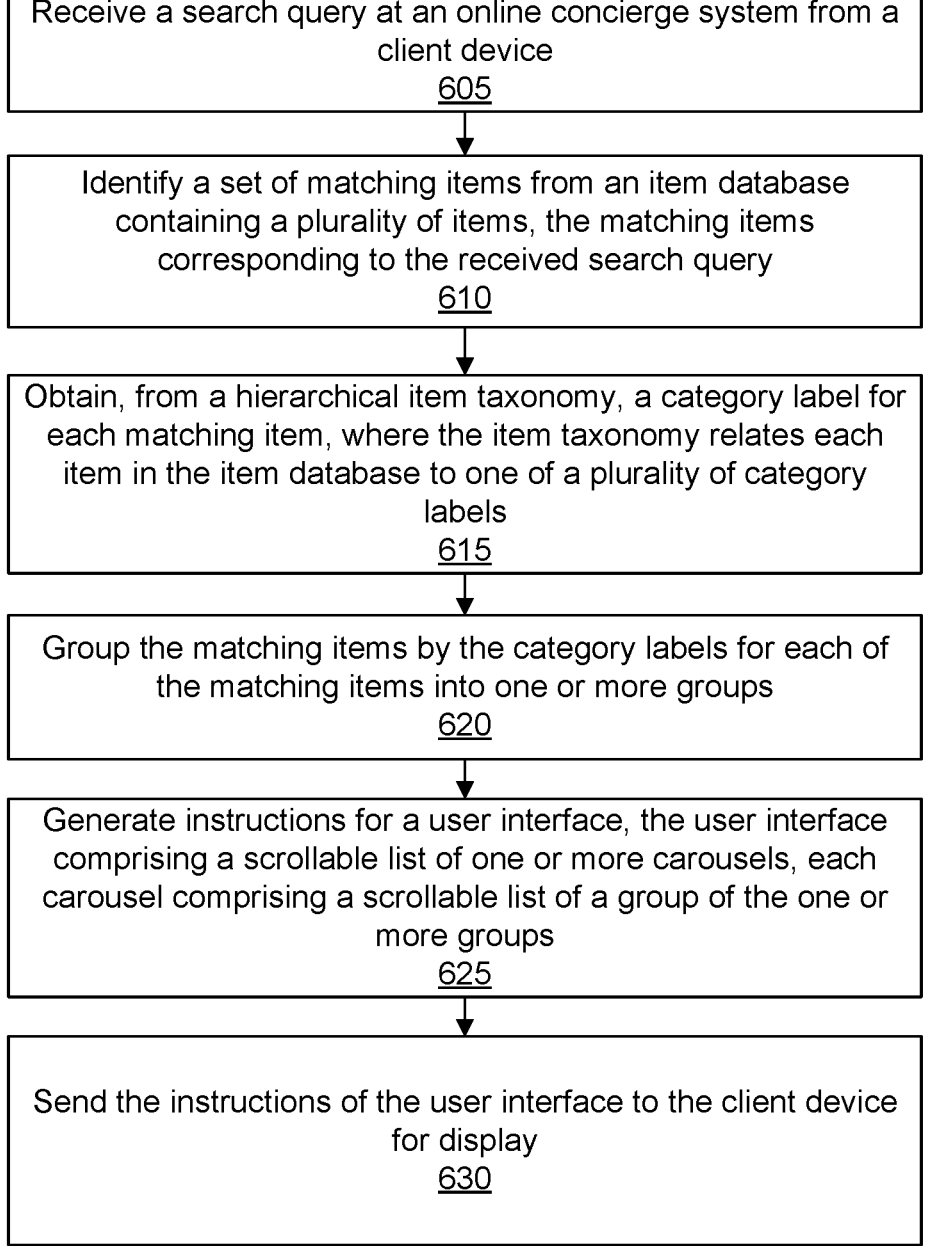

Receive a search query at an online concierge system from a client device
605

Identify a set of matching items from an item database containing a plurality of items, the matching items corresponding to the received search query
610

Obtain, from a hierarchical item taxonomy, a category label for each matching item, where the item taxonomy relates each item in the item database to one of a plurality of category labels
615

Group the matching items by the category labels for each of the matching items into one or more groups
620

Generate instructions for a user interface, the user interface comprising a scrollable list of one or more carousels, each carousel comprising a scrollable list of a group of the one or more groups
625

Send the instructions of the user interface to the client device for display
630

FIG. 6

METHOD, MEDIUM, AND SYSTEM FOR A USER INTERFACE WITH SEARCH RESULTS LOGICALLY ORGANIZED BY CAROUSELS

CROSS-REFERENCE TO RELATED APPLICATIONS

This application claims the benefit of U.S. Provisional Patent Application Ser. No. 63/317,942, filed Mar. 8, 2022, which is incorporated by reference in its entirety.

BACKGROUND

This disclosure relates generally to computer hardware and software for ordering an item through an online system, and more specifically to generating and presenting user interfaces for selecting an item for inclusion in an order.

To place an order through an online system, a user often has to navigate through fairly long lists of items offered by a warehouse or store to identify a specific item to include in the order. Similarly, a user may provide a search query to an online system to look for specific items for the user to include in an order. When a user frequently places orders through an online system, the user may spend a considerable amount of time navigating through listings of items in the search results or may provide different search terms to the online system to identify specific items for inclusion in an order. This amount of time may decrease a frequency with which a user interacts with the online system or a frequency with which the user subsequently places orders via the online system.

SUMMARY

When a user searches for an item from an online system, the search results may be presented in a listing that is unlike how the user would actually encounter the items in real life. For example, an online system may rank items according to a popularity score or a prediction that the user is likely to be searching for each ranked item. As a result, the items are presented to the user in a listing that intermixes items of different types, and in a long feed of results. For example, in response to a query of "milk," the user might see a list that contains, in order, 2% milk, milk chocolate bars, powdered milk, chocolate milk mix, and whole milk. But these products would not likely be encountered in such an order in a physical store, and the structure of the search results might therefore not make sense to a user. Unlike walking down the aisle of a store and viewing the items on the shelves, the user in the above example is not presented with information about the breadth of items that a store has within a given category. Traditional techniques of displaying search results, such as the aforementioned list, can waste computing resources by drawing out the process of a user finding and selecting an item. This necessitates longer commitments of computing resources to providing the user interface, for example. Such traditional techniques also offer few options to enable a user to improve their search query.

Aspects of the disclosure address these and other problems. For example, some aspects relate to a user interface for users of an online system that provides items in search results in a more intuitive and easier to use format. One or more aspects of the disclosure thus not only improve the user experience but also improve over prior systems by providing a user interface that enables the user to interface with a large set of data managed by the system more efficiently, such as by more directly exposing items with high likelihoods of relevance using highly navigable graphical elements.

In accordance with one or more aspects of the disclosure, an online concierge system receives a search query from a client device. The online concierge system identifies a set of matching items from an item database. The matching items correspond to the received search query. The online concierge system obtains, from a hierarchical item taxonomy, a category label for each matching item. The item taxonomy relates each item in the item database to one of a plurality of category labels. The online concierge system groups the matching items by the category labels for each of the matching items into one or more groups. The online concierge system generates instructions for a user interface. The user interface includes a scrollable list of one or more carousels. Each carousel includes a scrollable list of a group of the one or more groups. The online concierge system sends the instructions of the user interface to the client device for display. Depending upon the embodiment, the online concierge system may alternatively or additionally group matching items by multiple attributes, e.g., multiple matching category labels, and/or based on user preferences, such as categories for which the user has been found to have high affinity based on past orders by the user.

BRIEF DESCRIPTION OF THE DRAWINGS

FIG. 6 is a flowchart illustrating a process of an online concierge system, according to one or more embodiments.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
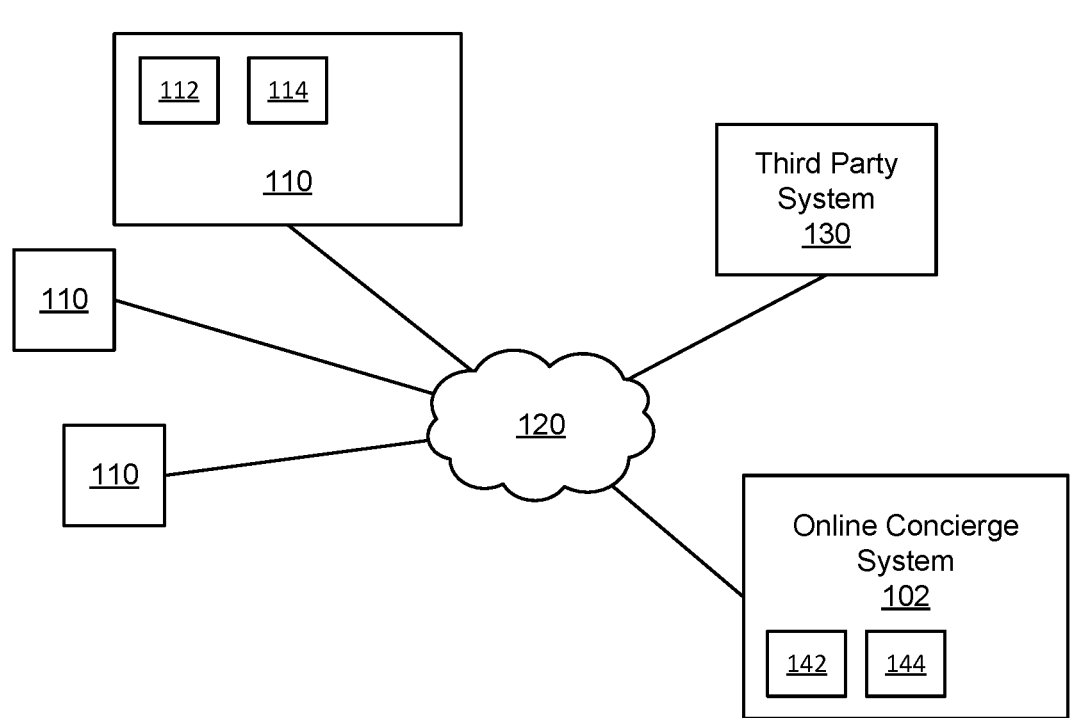
FIG. 1 is a block diagram of a system environment in which an online system, such an online concierge system, operates, according to one or more embodiments.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130. In one or more embodiments, the third party system 130 is a computing system of a warehouse that sends catalog and/or inventory information to the online concierge system 102.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described above in conjunction with FIGS. 2 and 5-6. For example, the memory 144 has instructions encoded thereon that, when executed by the processor 142, cause the processor 142 to generate instructions for a user interface that includes one or more dynamically determined carousels that display items satisfying a search query. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-6, and may include specific computing components such as processors, memories, communication interfaces, and/or the like.

System Overview

Figure 2:
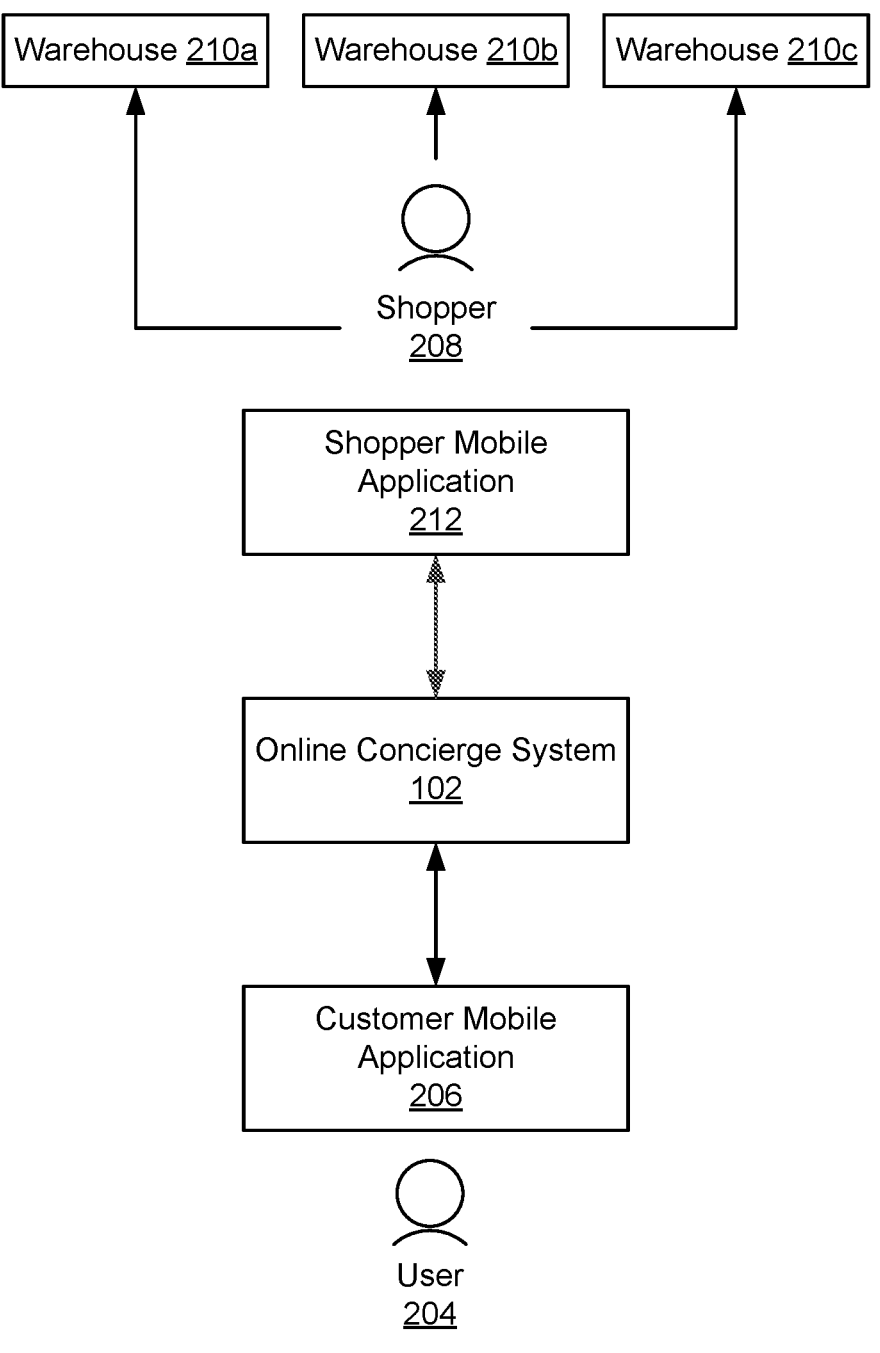
FIG. 2 illustrates an environment of an online shopping concierge service, according to one or more embodiments.

FIG. 2 illustrates an environment 200 of an online platform, such as an online concierge system 102, according to one embodiment. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (i.e., items, products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210*a*, 210*b*, and 210*c* (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
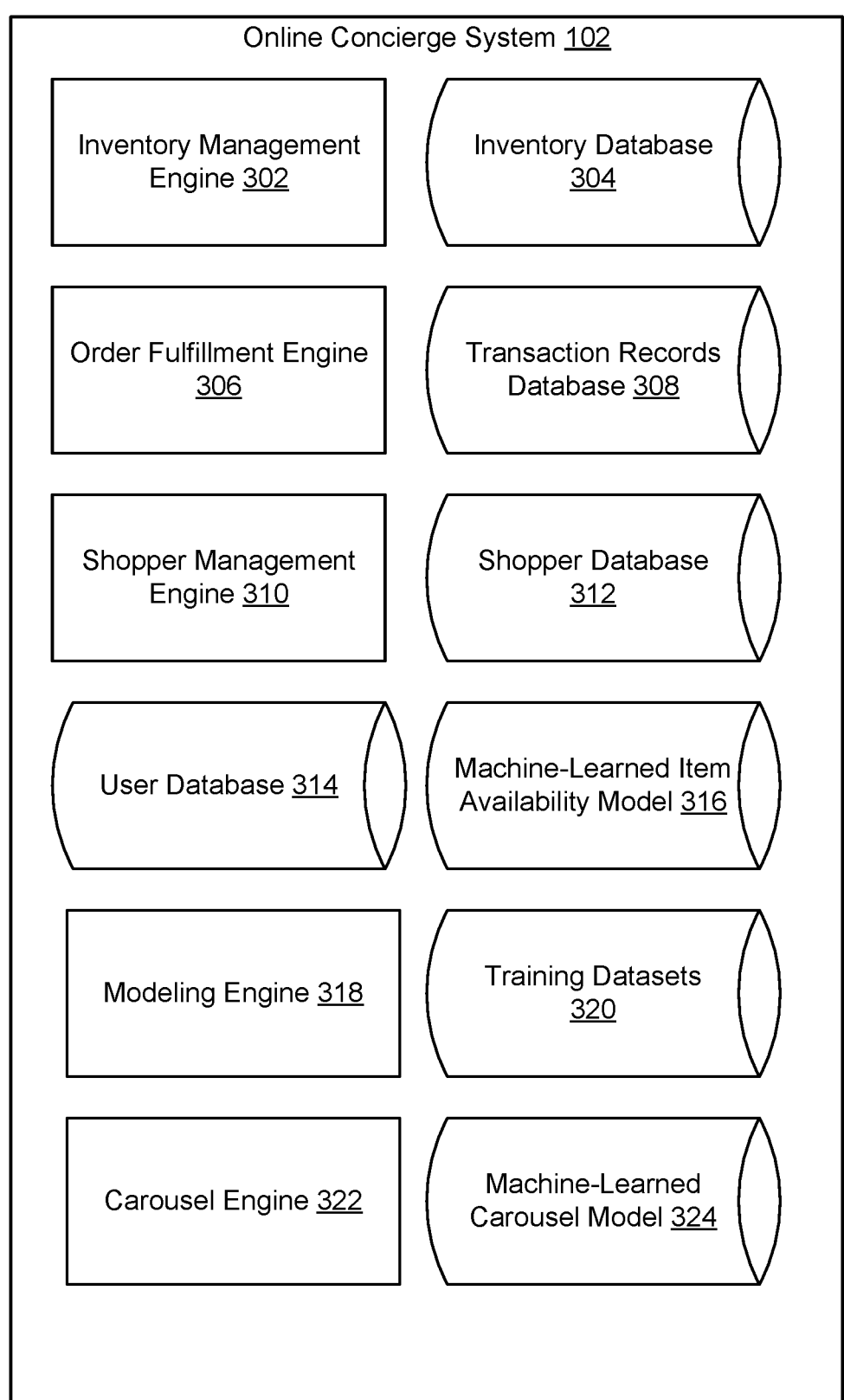
FIG. 3 is a diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 provides a search interface for users to search for items in the online system's database, such as items for sale, as described below. The online concierge system 102 receives a search query from a user and then provides search results (e.g., items) to the user in a user interface. To improve the search results in the user interface, the online system receives a query from a user and organizes the search results in a way that is more intuitive to the user. For example, the search results are provided in a format, such as a carousel, that emulates or is otherwise analogous to how the items might actually exist on the shelves of a physical store. In particular, a physical store layout organizes items according to a logical grouping. That is, items in a store are typically placed together with other items in the same product category (e.g., dairy products, baked goods, cleaning supplies, etc.). Accordingly, the system may organize the search results presented in the user interface according to logical categories of the products, thereby giving the user a better sense of what items are in the search results. In one or more embodiments, the categories or other groupings of the items are determined according to a hierarchical taxonomy, as described below.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item if they exist. For example, age-restricted items such as alcohol and tobacco are flagged accordingly in the inventory database 304.

Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the online concierge system 102 determines a taxonomy of items offered by the warehouse 210. Different levels in the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Each category has a category label, such as a "milk" category label for the respective "milk" category. Thus, the taxonomy maintains associations between a category and specific items offered by the warehouse 210 matching the category.

In various embodiments, the taxonomy identifies a generic item description corresponding to a category and associates one or more specific items with the category based on their similarity to the generic item description. For example, a generic item description identifies "milk," and the taxonomy associates identifiers of different milk items (e.g., milk offered by different brands, milk having one or more different attributes, etc.), with the category. Thus, the taxonomy maintains associations between a generic item description and specific items offered by the warehouse matching the generic item description.

In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., lower levels include a fewer number of items satisfying a more specific category).

For example, each category label corresponds to a taxonomy node in the hierarchical item taxonomy, which may be a hierarchical taxonomy tree or hierarchical taxonomy graph that includes edges and nodes. Each level of the hierarchical item taxonomy includes one or more taxonomy nodes corresponding to respective category of a particular level of specificity. Each taxonomy node has as children zero or more child taxonomy nodes at a lower level. A taxonomy node's child taxonomy nodes correspond to categories that divide the items matching the generic item description of the taxonomy node according to more specific generic item identifiers. For example, a taxonomy node for "vegetables" may have as child taxonomy nodes "broccoli," "carrots," "cauliflower," and "brussels sprouts." The "carrots" taxonomy node may have as children "whole carrot," "shredded carrot," "baby carrot," etc.

The taxonomy may be received from a warehouse 210 in various embodiments. In other embodiments, the inventory management engine 302 applies a trained classification model to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 304 with an item availability predicted by the machine-learned item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine e10 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

The user database 314 may store one or more user profiles. A client device 110 with a customer mobile application 206 may be associated with a user profile. For example, if the customer mobile application 206 is associated with the user profile, the client device 110 containing the customer mobile application 206 is associated with the user profile. A customer mobile application 206 may be associated with the user profile, for example, if a user signs into the customer mobile application 206 using login information of the user profile.

The user profile may include a user embedding that characterizes the user profile, e.g., which characterizes past orders and/or other actions of the user. The online concierge system 102 may generate the user embedding based on some or all information stored in association with the user.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Machine Learning Models

The online concierge system 102 further includes a machine-learned item availability model 316, a modeling engine 318, and training datasets 320, as well as a machine-learned carousel model 324. The modeling engine 318 uses the training datasets 320 to generate the machine-learned item availability model 316 and/or the machine-learned carousel model 324. Depending upon the embodiment, the machine-learned carousel model 324 may include one or more machine-learned models, e.g., to perform different functions, as described below, though for clarity of description the one or more machine-learned carousel models 324 are typically described herein as one model. The machine-learned item availability model 316 and/or the machine-learned carousel model 324 can learn from the training datasets 320, rather than follow only explicitly programmed instructions.

The inventory management engine 302, order fulfillment engine 306, and/or shopper management engine 310 can use the machine-learned item availability model 316 to determine a probability that an item is available at a warehouse 210. The machine-learned item availability model 316 may be used to predict item availability for items being displayed to or selected by a user or included in received delivery orders. A single machine-learned item availability model 316 is used to predict the availability of any number of items.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 304). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

The carousel engine 322 can use the machine-learned carousel model 324 to determine a probability that a category in the taxonomy is relevant to a search query. Depending upon the embodiment, the carousel engine 322 may also use the machine-learned carousel model 324 to determine a probability that an item in the taxonomy is relevant to the search query. One machine-learned carousel model 324 may be used to predict the relevancy of any number of items, and/or any number of categories.

The machine-learned carousel engine 322 can be configured to receive as inputs a search query, information about one or more items, the warehouse for picking the items, and the item taxonomy. The machine-learned item carousel model 324 may be adapted to receive any information that the modeling engine 318 identifies as indicators of category relevance to the search query and/or item relevance to the search query. At minimum, the machine-learned carousel model 324 receives information about a search query.

Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the machine-learned carousel model 324.

The machine-learned carousel model 324 contains a set of functions generated by the modeling engine 318 from the training datasets 320 that relate the search query, warehouse, taxonomy, timing information, user profile, and/or any other relevant inputs, to the probability that category and/or item is relevant to the search query. Thus, for a given search query, the machine-learned carousel model 324 outputs a probability that each of one or more categories and/or each of one or more items is relevant to the search query. In one or more embodiments, the machine-learned carousel model 324 includes a first model that outputs a probability that each of one or more categories is relevant to the search query and a second model that outputs a probability that each of one or more items is relevant to the search query.

The machine-learned carousel model 324 constructs the relationships among the inputs and the output probability. The relationships are generic enough to apply to any number of different search query-item and/or search query-category pairs. In some embodiments, the probability output by the machine-learned carousel model 324 includes a confidence score. The confidence score may be the error or uncertainty score of the output probability and may be calculated using any standard statistical error measurement. In some examples, the confidence score is based in part on whether the prediction was accurate for previous delivery orders (e.g., if the category and/or item was predicted to be relevant to the query and not interacted with by the customer via user input (e.g., according to one or more click through rate (CTR) metrics), or predicted to be less relevant to the query but was interacted with by the customer via user input (e.g., according to one or more CTR metrics)). The set of functions of the machine-learned carousel model 324 may be updated and adapted following retraining with new training datasets 320, e.g., based on the CTR metrics recorded in association with instances of user interfaces, displaying carousels of items, that were sent for display to client devices of users in response to respective search queries. The machine-learned carousel engine 322 may be any machine learning model, such as a neural network, boosted tree, gradient boosted tree or random forest model. In some examples, the machine-learned carousel engine 322 is generated from XGBoost algorithm.

The probability generated by the machine-learned carousel model 324 may be used to determine instructions delivered to the user 204 (e.g., a client device 110 with a customer mobile application 206) and/or shopper 208 (e.g., a client device 110 with a shopper mobile application 212), as described in further detail below.

The training datasets 320 relate a variety of different factors to known item and/or category relevance to a search query from the outcomes of previous delivery orders (e.g., if an item and/or category was previously found to be relevant, e.g., as determined by CTR metrics, such as whether the user added a particular item or an item from a particular category to a cart). The training datasets 320 include the items and/or categories included in user interfaces for previous search queries, whether the items and/or their categories were interacted with by the user, warehouses associated with the previous search queries, and a variety of characteristics associated with each of the items and/or categories (which may be obtained from the inventory database 304).

Each piece of data in the training datasets 320 includes the outcome of a previous search query (e.g., if the item and/or category was interacted with or not via the user interface). The item and/or category characteristics may be determined by the machine-learned carousel model 324 to be statistically significant factors predictive of the item's relevance to a search query. For different items and/or categories, the characteristics that are predictors of availability may be different. For example, a first factor might be the best predictor of relevance for dairy items, whereas a second factor may be the best predictive factor of availability for vegetable categories. For each item and/or category, the machine-learned carousel model 324 may weight these factors differently, where the weights are a result of a "learning" or training process on the training datasets 320. The training datasets 320 are very large datasets taken across a wide cross section of warehouses, shoppers, items, warehouses, delivery orders, times, categories, category characteristics (e.g., attributes of a generic item description of a category with a particular category label) and item characteristics. The training datasets 320 are large enough to provide a mapping from an item and/or category to a probability that the item and/or category is relevant to a search query. In addition to previous search queries, the training datasets 320 may be supplemented by inventory information provided by the inventory management engine 302. In some examples, the training datasets 320 are historic search query information used to train the machine-learned carousel model 324, whereas the inventory information stored in the inventory database 304 include factors input into the machine-learned carousel model 324 to determine an item and/or category relevance for a search query (e.g., a newly received search query).

In one or more embodiments, the online concierge system 102 determines whether to list the search results in a carousel or in a traditional listing based on a prediction of whether a user will take a desired action given one option or the other. For example, the online concierge system 102 may train machine learning models (e.g., the machine-learned carousel model 324) to predict whether a user will take an action (such as adding a product to a cart or purchasing the product) given a specific layout of the user interface. The online concierge system 102 applies the trained model to a candidate layout that groups products of the same category into a carousel and another candidate layout that does not. The online concierge system 102 can then select the layout that is associated with the highest likelihood of the desired action. Beneficially, the models may be trained based in part on user-specific features (user preferences/profile, purchase history, etc.), so the online concierge system 102 can thus make the decision about the user interface based on information about the user's affinity towards products.

In one or more embodiments, the machine-learned carousel model 324 uses output from the machine-learned item availability model 316 as input when determining the probability that an item and/or category is relevant to a search query. For example, if an item is expected to be not available by the output from the machine-learned item availability model 316, the machine-learned carousel model 324 may disregard or reduce the probability score for the item. Alternatively or additionally, the carousel engine 322 may use the output of the machine-learned item availability model 316 to remove unavailable items from the catalog and/or taxonomy before using the machine-learned carousel model 324.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

The training datasets 320 may include pairs of search queries and items and/or categories labeled as relevant or non-relevant. The labeling may be manual for some or all pairs, or may be automatically determined according to user feedback. For example, training data may be generated based on user interactions with search results displayed in response to a search query, where search results interacted with by the user, as well as respective categories, are labeled as relevant and other search results and categories are labeled as non-relevant.

Customer Mobile Application

Figure 4A:
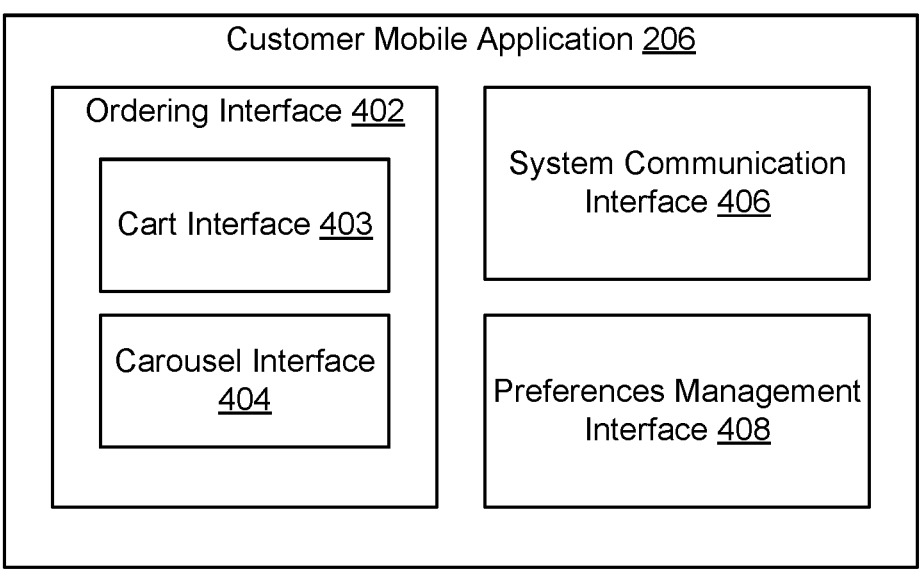
FIG. 4A is a diagram of a customer mobile application (CMA), according to one or more embodiments.

FIG. 4A is a diagram of the customer mobile application (CMA) 206, according to one embodiment. The CMA 206 includes an ordering interface 402, which provides an interactive interface with which the user can browse through and select products and place an order. The CMA 206 also includes a system communication interface 406 which, among other functions, receives inventory information from the online shopping concierge system 102 and transmits order information to the online concierge system 102. The CMA 206 also includes a preferences management interface 408 which allows the user to manage basic information associated with his/her account, such as his/her home address and payment instruments. The preferences management interface 408 may also allow the user to manage other details such as his/her favorite or preferred warehouses 210, preferred delivery times, special instructions for delivery, and so on.

In one or more embodiments, the ordering interface 402 includes a cart interface 403, which displays items selected by the user 204 for ordering. As the user 204 uses the client device 110 to select items to order, the items are populated in the cart interface 403. In one or more embodiments, the cart interface 403 visualizes a list of selected items using one or more graphical elements for each selected item. The user 204 can use the cart interface 403 to manage items, such as select a substitute item for an item that is unavailable (e.g., out of stock at the warehouse 210). The cart interface 403 provides options for the user 204 to cancel the order and/or to place the order.

The ordering interface 402 also includes a carousel interface 404, which displays search results in response to a search query. The carousel interface 404 displays the search results (e.g., items) using one or more carousels, as further described below with reference to FIG. 5. The CMA 206 receives a search query via user input and sends the search query to the online concierge system 102 for processing (e.g., by the carousel engine 322). The CMA 206 receives instructions for one or more user interfaces and/or other data from the online concierge system 102 and responsively performs one or more functions using the received data, such as displaying a user interface.

Shopper Mobile Application

Figure 4B:
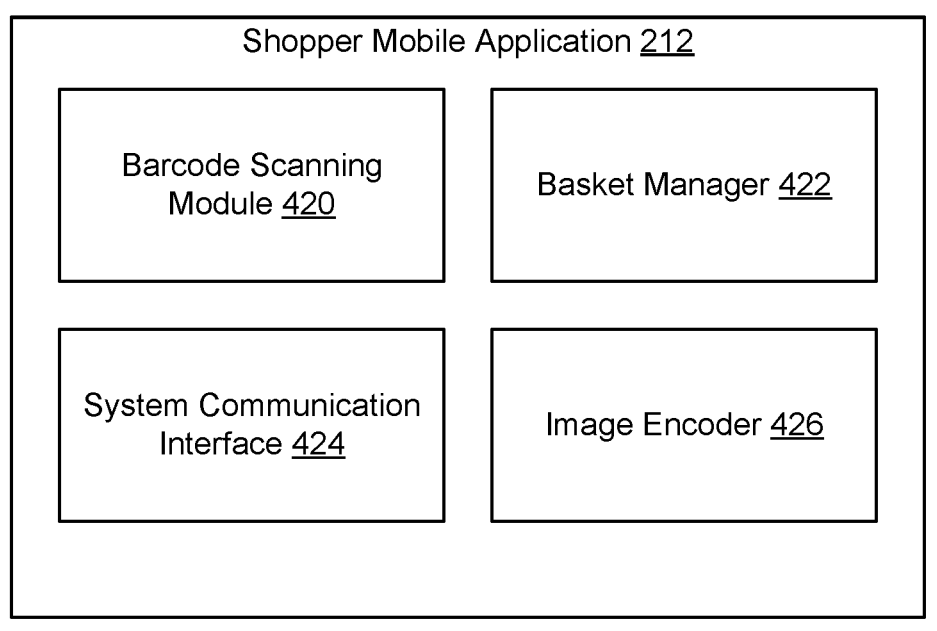
FIG. 4B is a diagram of a shopper mobile application (SMA), according to one or more embodiments.

FIG. 4B is a diagram of the shopper mobile application (SMA) 212, according to one embodiment. The SMA 212 includes a barcode scanning module 420 which allows a shopper 208 to scan an item at a warehouse 210 (such as a can of soup on the shelf at a grocery store). The barcode scanning module 420 may also include an interface which allows the shopper to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Carousel Engine

Turning back to FIG. 3, the carousel engine 322 dynamically determines carousels and generates user interfaces including carousels in response to received search queries. The received search query may be associated with a particular warehouse 210. In one or more embodiments, in response to the search query, the carousel engine 322 obtains a set of search results from the item database that match the query. For example, the carousel engine 322 applies the search query and the item taxonomy (which may be particular to the warehouse 210) to the machine-learned carousel model 324 to produce a relevance probability for each item in the taxonomy. The carousel engine 322 selects a set of matching items from the item taxonomy that includes some or all items with a relevance probability greater than a relevance probability threshold. Alternatively, the carousel engine 322 selects as the set of matching items the top X items with the greatest relevance probability scores, where X is set by an administrator of the online concierge system 102.

The carousel engine 322 may further obtain from the taxonomy one or more category labels associated with each of the matched items (i.e., search results). The category label for an item may be that of a higher-level node in the taxonomy associated with the item. Moreover, multiple labels may be obtained for an item, where each label is a different level of the taxonomy. For example, a particular milk product may correspond to a "dairy" taxonomy node, a "milk" taxonomy node, and a "2% milk" taxonomy node, and the system obtains a "dairy" category label, a "milk" category label, and a "2% milk" category label for the particular milk product.

The carousel engine 322 uses the machine-learned carousel model 324 to identify a category in the taxonomy that is most relevant to the search query. The carousel engine 322 applies the search query to the machine-learned carousel model 324, which produces a relevance probability for some or all categories in the taxonomy (e.g., categories at one or more particular levels, or all levels, depending upon the embodiment). The carousel engine 322 identifies a category with the greatest relevance probability as the most relevant category.

In one or more embodiments, the carousel engine 322 identifies the most relevant category from a subset of the levels of the taxonomy. For example, the carousel engine 322 may be configured to not select as the identified category any category from the top one or two levels of the taxonomy, and/or to not select as the identified category any category from the bottom one or two levels of the taxonomy, and/or so on.

In one or more embodiments, the carousel engine 322 determines relationships between each search result and the most relevant category. For example, the carousel engine 322 determines one or more categories with which a search result is affiliated (e.g., based on one or more category labels associated with the item). The carousel engine 322 determines whether the search result is affiliated with the most relevant category, a child in the taxonomy of the most relevant category, a parent in the taxonomy of the most relevant category, and so on. In one or more embodiments, the carousel engine 322 discards a search result if its relation to the most relevant category is through a category at the top level of the taxonomy.

The carousel engine 322 groups the items in the search results (the matched items). The carousel engine 322 may group the matched items based on their corresponding category labels. For example, all products that are under the label "Dairy" in the taxonomy are grouped together, and so on. The carousel engine 322 may identify a set of categories related to the most relevant category (e.g., child taxonomy nodes), and sort some or all of the search results among the set of categories to form item groups. The carousel engine 322 provides the search results in a user interface according to these groups, which are displayed as carousels, as described below.

In one or more embodiments, the carousel engine 322 identifies, for each matched item, a category in the taxonomy with which the matched item is associated and which is related to the most relevant category, as a child of the most relevant category or as another category at the same level as the most relevant category. For example, among the matched items, three quarters may correspond to categories that are children of the most relevant category, and one quarter may correspond to categories that are at the same level as the most relevant category. As a particular example, a search query for "chips" may match to a "chips" category, and particular search results may be divided among children of the "chips" category, such as "tortilla chips," "potato chips," and "corn chips," as well as siblings of the "chips" category (e.g., categories at the same level of the taxonomy that are related through a parent category from which both are children), such as a "salsa" category and a "dip" category, which along with the "chips" category may all be children of a "snacks" category in the taxonomy.

In some embodiments, the carousel engine 322 determines whether to show the search results in a carousel format, as described above, or in a traditional straight listing of products that is not grouped by category. For example, the carousel engine 322 may analyze the diversity of categories among the matched items and group the results into different carousels only if there are at least a threshold number of different categories. For example, a threshold test may depend on the number of unique categories, or the percentage of top search results that have less than a threshold number of categories, or any other suitable criteria for category diversity. Conversely, when the search results are more diverse and thus are not generally in a small number of categories, it may make less sense to organize the results as described above, and a more traditional listing of results by relevance may be used. In one or more embodiments, the carousel engine 322 determines a specificity of the search query, e.g., by identifying a level of the most relevant category to which the search query matches. For search queries with at least a threshold specificity, the carousel engine 322 may generate a user interface that does not include a carousel, but instead lists search results that match the specific search query. In one or more embodiments, if at least a threshold number of the search results with the highest relevance probabilities do not correspond to groups identified by the carousel engine 322, the carousel engine generates a user interface that does not include a carousel.

In other embodiments, the carousel engine 322 can select different levels in the product taxonomy or different attributes therefrom to group the search results into carousels. For example, candidate groupings could be according to a lower-level category, a higher-level category, or even product attributes shared across categories (e.g., organic, low-carb, nut-free, etc.). In this way, the carousel engine 322 may organize search results into a carousel for "milk" or into multiple carousels for "whole milk," "skim milk," "low-fat milk," etc. The carousel engine 322 may test the various combinations by applying the machine-learned carousel model 324 to determine the candidate carousel (which corresponds to a category) with the highest likelihood of a desired result (e.g., user interaction).

In one or more embodiments, the carousel engine 322 uses the machine-learned carousel model 324 to identify a level in the taxonomy that has the highest relevance to the search query. The carousel engine 322 uses the identified level to determine the categories used for carousels. For example, the carousel engine 322 may generate carousels for categories at the identified level for which the machine-learned carousel model 324 has output at least a threshold relevance to the search query. In one or more embodiments, the online concierge system may group matching items by multiple attributes, e.g., multiple matching category labels.

In one or more embodiments, the carousel engine 322 restricts the number of carousels generated (e.g., a number of categories to which search results are grouped). As a particular example, the maximum number of carousels may be 10, though the particular value may be implemented as any whole number that is not negative.

In one or more embodiments, the carousel engine 322 discards groups containing fewer than a threshold number of matched items, such as two items. In one or more embodiments, the carousel engine 322 determines whether a group has over a certain number of items, and if so, discards items from the group with the lowest relevance scores such that only the certain number of items with the highest relevance scores remain. In one or more embodiments, the carousel engine 322 groups search results according to respective categories, and discards any group corresponding to a category that does not share a top level parent with the most relevant category. In one or more embodiments, if at least a threshold number of the search results with the highest relevance probabilities are grouped in the same group, the carousel engine 322 generates a user interface that does not include a carousel, but instead lists the matched items, e.g., in order of relevance probability.

Once the carousel engine 322 has divided the search results into groups according to a set of categories, the carousel engine 322 determines a relevance score for each group. In one or more embodiments, the carousel engine 322 determines the relevance score based on the relevance probability of one or more items in the group. As a particular example, the carousel engine 322 may sum or average the three highest relevance probabilities in each group to produce a respective relevance score. Depending upon the embodiment, any number of items in a group may be used by the carousel engine 322 to determine the relevance score.

The carousel engine 322 selects one or more groups for display within the user interface as carousels based on the respective relevance scores. Depending upon the embodiment, the carousel engine 322 may select the top Y groups by relevance score, where Y is set by an administrator of the online concierge system 102. Alternatively, the carousel engine 322 may select all, or up to Y, groups with relevance scores greater than a relevance score threshold. Items may be listed within a carousel by the carousel engine 322 in order of respective relevance probability. In one or more embodiments, the carousel engine 322 only generates carousels for the user interface if there are at least a threshold number of groups, such as three. In one or more embodiments where the groups are ranked, the carousel engine 322 generates a user interface such that the carousels are displayed in order according to the rankings of their respective groups.

In one or more embodiments, the carousel engine 322 includes in the user interface a carousel that contains a subset of the matched items with greatest relevance probabilities, such as a five most relevant items, without consideration for the categories of the items.

In one or more embodiments, the carousel engine 322 ranks the groups according to historic user feedback, such as CTR metrics. The carousel engine 322 identifies user feedback for past instances of the search query and/or past instances of similar search queries and identifies items and/or groups with which the user interacted. The carousel engine 322 uses the identified items and/or groups to rank the groups, e.g., such that groups, and/or groups containing items, that were most often interacted with are ranked highest.

In one or more embodiments, the carousel engine 322 ranks the groups according to a user profile associated with the received search query. The carousel engine 322 generates a carousel embedding for each group. Depending upon the embodiment, this may involve the carousel engine 322 averages the item embeddings of some or all items in the group (e.g., the top three items in the group by relevance probability). The carousel engine 322 ranks the groups according to a comparison between the carousel embedding and the user embedding from the user profile. For example, the carousel engine 322 may determine an affinity score for each group and rank the groups accordingly. The carousel engine 322 may determine the affinity score for a group by performing a dot product operation or a cosine similarity on the user embedding and the group embedding.

In one or more embodiments, the carousel engine 322 ranks the groups according to a multi-armed bandit algorithm. The carousel engine 322 clusters users into groups according to their relative affinities, as determined by comparing their user embeddings. The carousel engine 322 runs a set of bandit algorithms, one for each cluster, to identify a set of most relevant groups for each cluster. The carousel engine 322 can identify the cluster with which the user, from whose client device 110 the search result was received, is associated, and use the respective set of most relevant groups to rank the groups for the search query.

Figure 5:
FIG. 5 illustrates a simplified user interface of a carousel interface, according to one or more embodiments.

FIG. 5 illustrates a simplified user interface of a carousel interface, according to one or more embodiments. The carousel interface is a user interface for which instructions are generated by the carousel engine 322, and may be displayed, for example, upon a client device 110, e.g., as part of a customer mobile application 206. Depending upon the embodiment, the carousel interface includes one or more carousels, which are scrollable lists of items (e.g., matched items within a group represented by the carousel). The one or more carousels themselves may form a scrollable list. For example, each carousel may be horizontally scrollable, and the list of carousels may be vertically scrollable, or vice versa. Depending upon the embodiment, the carousel interface may alternatively or additionally include an item list of one or more matching items, which may or may not include duplicates of items in one or more carousels.

The carousel interface 500 includes a search bar 505. Some embodiments of the carousel interface 500 do not include a search bar 505. The search bar is a region of the user interface into which user input may be entered, e.g., to send a search query to the online concierge system 102. The carousel interface 500 displays the search bar 505 as well as a search query that was entered into the search bar 505, which is "Dairy" in the figure. As illustrated, the carousels in the carousel interface 500 represent categories that are children of the "Dairy" category, namely "Milk," "Yogurt," and "Cheese."

The carousel interface 500 includes a top results graphical element 510 that lists the top three matched items with the highest relevance probabilities. Depending upon the embodiment, the carousel interface 500 may or may not include a top results graphical element 510. For example, another embodiment may include a carousel at the region displaying the top results graphical element 510 in the carousel interface 500. In some embodiments, after the carousels, e.g., below the carousels in the interface, the carousel interface 500 includes an item list.

The carousel interface 500 includes three carousels, two full carousels labeled "Milk" and "Yogurt," and a partial carousel labeled "Cheese." Other embodiments may include fewer or more carousels. The "Milk" carousel includes a "Milk" 520 label, a set of items including item 525, and a view more graphical element 515. In the embodiment of the figure, the carousels are horizontally scrollable, as indicated by arrow 530. The listing of carousels themselves is scrollable vertically, as indicated by arrow 535. For example, the "Cheese" carousel could be brought into view by user input to the carousel interface 500 to adjust the interface such that it displays a lower portion of the interface.

User input to an item in the carousel interface 500, such as item 525, can add the item to the user's cart, in one or more embodiments. The view more graphical element 515, upon receiving user input, initiates a new search query based on the category represented by the carousel, such as "Milk" for view more graphical element 515. This may cause the online concierge system 102 to generate a new user interface for the new search query and send the new user interface to the client device 110.

In one embodiment, the user interface comprises a vertically scrollable listing of carousels, where each carousel is a horizontally scrollable list of items. The system places all items corresponding to a particular category label in the same carousel. As a result, the user interface shows a scrollable listing of carousels, where each carousel corresponds to a logical grouping of items that match the user's search query. This provides an intuitive user interface that emulates how the user might encounter the products in a physical store. Embodiments of organizing products in a user interface such as this are described in U.S. patent application Ser. No. 17/496,829, filed Oct. 8, 2021, which is incorporated by reference in its entirety.

FIG. 6 is a flowchart illustrating a process of an online concierge system to generate a user interface including a dynamically determined carousel, according to one or more embodiments. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments, while in other embodiments, the steps of the method are performed by any computing system.

An online concierge system receives 605 a search query from a client device. The online concierge system identifies 610 a set of matching items from an item database containing a plurality of items. The matching items correspond to the received search query. The online concierge system obtains 615, from a hierarchical item taxonomy, a category label for each matching item. The item taxonomy relates each item in the item database to one of a plurality of category labels. The online concierge system groups 620 the matching items by the category labels for each of the matching items into one or more groups. The online concierge system generates 625 instructions for a user interface. The user interface includes a scrollable list of one or more carousels. Each carousel includes a scrollable list of a group of the one or more groups. The online concierge system sends 630 the instructions of the user interface to the client device for display.

In one or more embodiments, obtaining, from the item taxonomy, the category label for each matching item includes the online concierge system 102 identifying a category label corresponding to the received search query, identifying one or more category labels related to the category label that corresponds to the received search query and one or more of the matched items, and obtaining the identified one or more category labels.

In one or more embodiments, identifying the category label corresponding to the received search query includes the online concierge system 102 applying the received search query to a machine learning model, wherein the machine learning model outputs a probability that a category label is relevant for one or more category labels of the plurality of category labels, and the machine learning model is trained on search queries and respective user feedback signaling a relevance of one or more category labels of the plurality of category labels.

In one or more embodiments, obtaining, from the item taxonomy, the category label for each matching item includes the online concierge system 102 determining that at least a threshold number of matching items correspond to one particular category label, identifying a plurality of lower level category labels corresponding to the particular category label, wherein the plurality of lower level category labels are more specific than the particular category label, matching one or more of the matching items to one or more of the lower level category labels, and obtaining the matched one or more lower level category labels.

In one or more embodiments, the client device is associated with a user profile, and the online concierge system 102 ranks the one or more groups based on the user profile, wherein the one or more carousels of the scrollable list are ordered according to the ranking.

In one or more embodiments, the user interface further comprises an item list that lists one or more of the set of matching items, and wherein the item list is located outside the scrollable list of one or more carousels. In one or more embodiments, the scrollable list is vertically scrollable, and each of the one or more carousels is horizontally scrollable. In one or more embodiments, the online concierge system 102 obtains the category labels from one particular level of the item taxonomy.

Additional Considerations

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the claims be limited not by this detailed description, but rather by any claims that issue on an application based hereon. Accordingly, the disclosure of the embodiments is intended to be illustrative, but not limiting, of the scope of the claims, which is set forth in the following.

What is claimed is:

1. A method comprising:

storing user data describing a user of an online system, wherein the user data describes a plurality of interactions of the user with the online system;

receiving a search query at the online system from a client device associated with the user;

responsive to receiving the search query, generating a plurality of carousels to display on the client device as a response to the search query, wherein each of the plurality of carousels is horizontally scrollable and comprises content describing a plurality of items, wherein generating the plurality of carousels comprises:

computing a query relevance probability score for each of a plurality of items stored in an item database based on the search query, the stored user data, and item data describing the plurality of items, wherein the query relevance probability score for an item is a score representing a predicted likelihood that a user would interact with the item when the item is presented to the user in response to a search query from the user;

identifying a set of matching items from the plurality of items based on the computed query relevance probability scores for the plurality of items;

obtaining, from a hierarchical item taxonomy, a taxonomy category label for each matching item in the set of matching items, wherein the hierarchical item taxonomy relates each item in the item database to one of a plurality of taxonomy category labels;

grouping items from the set of matching items based on the taxonomy category labels obtained from the hierarchical item taxonomy, wherein the grouping produces a plurality of groups, and wherein each of the plurality of groups comprises items from the set of matching items that are associated with a branch within the hierarchical item taxonomy associated with the category label associated with the group; and generating a carousel for each of the plurality of groups, wherein a carousel for a group is a scrollable user interface element comprising items associated with the group arranged in a list;

automatically arranging the generated carousels into a scrollable list based on the stored user data to generate a user interface displaying the set of matching items, wherein the scrollable list is vertically scrollable and wherein automatically arranging the generated carousels comprises:

applying a machine-learned carousel model to the stored user data, item data describing the set of matching items, and the received search query to generate a score for each of the generated carousels, wherein a generated score for a carousel represents a predicted likelihood that the branch of the hierarchical item taxonomy is relevant to the search query, and automatically arranging the generated carousels based on the generated scores, wherein the generated carousels are automatically arranged such that generated carousels with generated scores indicating a higher predicted likelihood are arranged vertically-higher in the scrollable list than generated carousels with generated scores indicating a lower predicted likelihood; and sending instructions for the user interface to the client device for display, wherein sending the instructions for the user interface to the client device causes the client device to automatically display the scrollable list of the plurality of carousels as results to the received search query, wherein the scrollable list of the plurality of carousels are displayed according to the automatic arrangement of the generated carousels, and wherein each of the generated carousels are displayed in the user interface with text describing the taxonomy category label associated with the generated carousel.

2. The method of claim 1, wherein obtaining, from the hierarchical item taxonomy, the category label for each matching item in the set of matching items, comprises:

identifying a category label that corresponds to the received search query;

identifying one or more related category labels related to the category label that correspond to both the received search query and one or more matched items from the set of matched items; and obtaining the one or more related category labels.

3. The method of claim 2, wherein identifying the category label that corresponds to the received search query comprises:

applying the received search query to a machine learning model, wherein the machine learning model outputs a probability that the category label is relevant, and the machine learning model is trained on search queries and respective user feedback signaling, for each of one or more category labels of the plurality of category labels, a relevance of the category label to one or more of the search queries.

4. The method of claim 1, wherein obtaining, from the hierarchical item taxonomy, the category label for each matching item in the set of matching items, comprises:

determining that at least a threshold number of matching items in the set of matching items correspond to one particular category label;

identifying a plurality of lower level category labels corresponding to the particular category label, wherein the plurality of lower level category labels are more specific than the particular category label;

matching one or more of the matching items to one or more of the lower level category labels, wherein the matching produces a subset of matched lower level category labels; and obtaining the subset of matched lower level category labels.

5. The method of claim 1, wherein the client device is associated with a user profile, the method further comprising:

ranking the plurality of groups based on the user profile, wherein the plurality of carousels of the scrollable list are ordered according to the ranking.

6. The method of claim 1, wherein the user interface further comprises an item list that lists one or more of the set of matching items, and wherein the item list is located outside the scrollable list of a plurality of carousels.

7. The method of claim 1, wherein obtaining the category label for each matching item in the set of matching items comprises:

applying the received search query to a machine learning model, wherein the machine learning model outputs a probability that a level of the hierarchical item taxonomy is relevant, for each level of a plurality of levels of the hierarchical item taxonomy; and obtaining the category label for each matching item in the set of matching items from a level of the hierarchical item taxonomy corresponding to a greatest relevance probability.

8. The method of claim 1, wherein at least one carousel of the plurality of carousels comprises a view more graphical element, the method further comprising:

receiving user input selecting a particular view more graphical element of a particular carousel corresponding to a particular category label; and responsive to receiving the user input, initiating a new search query using the particular category label.

9. The method of claim 1, further comprising:

receiving a second search query;

identifying a second set of matching items corresponding to the second search query;

determining that a subset of the second set of matching items comprises more than a threshold number of matching items from the second set of matching items, wherein the subset comprises matching items from the second set of matching items with relevance probabilities that are greater than relevance probabilities of matching items from the second set of matching items that are not in the subset; and generating instructions for a second user interface that lists the second set of matching items and does not include a carousel.

10. The method of claim 1, further comprising:

determining whether to generate search results in a carousels layout or in a listing layout based on a predicted likelihood of whether a user will take a desired action for each layout.

11. The method of claim 10, wherein determining whether to generate the search results in a carousels layout or a listing layout comprises:

generating the predicted likelihood by applying a machine-learning model to the stored user data, item data describing the set of matching items, and the received search query.

12. A computer program product comprising a non-transitory computer readable storage medium having instructions encoded thereon that, when executed by a processor, cause the processor to:

store user data describing a user of an online system, wherein the user data describes a plurality of interactions of the user with the online system;

receive a search query at the online system from a client device associated with the user;

responsive to receiving the search query, generate a plurality of carousels to display on the client device as a response to the search query, wherein each of the plurality of carousels is horizontally scrollable and comprises content describing a plurality of items, wherein generating the plurality of carousels comprises:

computing a query relevance probability score for each of a plurality of items stored in an item database based on the search query, the stored user data, and item data describing the plurality of items, wherein the query relevance probability score for an item is a score representing a predicted likelihood that a user would interact with the item when the item is presented to the user in response to a search query from the user;

identifying a set of matching items from the plurality of items based on the computed query relevance probability scores for the plurality of items;

obtaining, from a hierarchical item taxonomy, a taxonomy category label for each matching item in the set of matching items, wherein the hierarchical item taxonomy relates each item in the item database to one of a plurality of taxonomy category labels;

grouping items from the set of matching items based on the taxonomy category labels obtained from the hierarchical item taxonomy, wherein the grouping produces a plurality of groups, and wherein each of the plurality of groups comprises items from the set of matching items that are associated with a branch within the hierarchical item taxonomy associated with the category label associated with the group; and generating a carousel for each of the plurality of groups, wherein a carousel for a group is a scrollable user interface element comprising items associated with the group arranged in a list;

automatically arrange the generated carousels into a scrollable list based on the stored user data to generate a user interface displaying the set of matching items, wherein the scrollable list is vertically scrollable and wherein automatically arranging the generated carousels comprises:

applying a machine-learned carousel model to the stored user data, item data describing the set of matching items, and the received search query to generate a score for each of the generated carousels, wherein a generated score for a carousel represents a predicted likelihood that the branch of the hierarchical item taxonomy is relevant to the search query, and automatically arranging the generated carousels based on the generated scores, wherein the generated carousels are automatically arranged such that generated carousels with generated scores indicating a higher predicted likelihood are arranged vertically-higher in the scrollable list than generated carousels with generated scores indicating a lower predicted likelihood; and send instructions for the user interface to the client device for display, wherein sending the instructions for the user interface to the client device causes the client device to automatically display the scrollable list of the plurality of carousels as results to the received search query, wherein the scrollable list of the plurality of carousels are displayed according to the automatic arrangement of the generated carousels, and wherein each of the generated carousels are displayed in the user interface with text describing the taxonomy category label associated with the generated carousel.

13. The computer program product of claim 12, wherein instructions to obtain, from the hierarchical item taxonomy, the category label for each matching item in the set of matching items, comprise instructions that cause the processor to:

identify a category label that corresponds to the received search query;

identify one or more related category labels related to the category label that correspond to both the received search query and one or more matched items from the set of matched items; and obtain the one or more related category labels.

14. The computer program product of claim 13, wherein instructions to identify the category label that corresponds to the received search query comprise instructions that cause the processor to:

apply the received search query to a machine learning model, wherein the machine learning model outputs a probability that the category label is relevant, and the machine learning model is trained on search queries and respective user feedback signaling, for each of one or more category labels of the plurality of category labels, a relevance of the category label to one or more of the search queries.

15. The computer program product of claim 12, wherein instructions to obtain, from the hierarchical item taxonomy, the category label for each matching item in the set of matching items, comprise instructions that cause the processor to:

determine that at least a threshold number of matching items in the set of matching items correspond to one particular category label;

identify a plurality of lower level category labels corresponding to the particular category label, wherein the plurality of lower level category labels are more specific than the particular category label;

match one or more of the matching items to one or more of the lower level category labels, wherein the matching produces a subset of matched lower level category labels; and obtain the subset of matched lower level category labels.

16. The computer program product of claim 12, wherein the client device is associated with a user profile, the instructions further comprising instructions that cause the processor to:

rank the plurality of groups based on the user profile, wherein the plurality of carousels of the scrollable list are ordered according to the ranking.

17. The computer program product of claim 12, wherein the user interface further comprises an item list that lists one or more of the set of matching items, and wherein the item list is located outside the scrollable list of a plurality of carousels.

18. The computer program product of claim 12, wherein at least one carousel of the plurality of carousels comprises a view more graphical element, the instructions further comprising instructions that cause the processor to:

receive user input selecting a particular view more graphical element of a particular carousel corresponding to a particular category label; and responsive to receiving the user input, initiate a new search query using the particular category label.

19. A system, comprising:

a processor; and a non-transitory computer readable storage medium having instructions encoded thereon that, when executed by the processor, cause the processor to:

store user data describing a user of an online system, wherein the user data describes a plurality of interactions of the user with the online system;

receive a search query at the online system from a client device associated with the user;

responsive to receiving the search query, generate a plurality of carousels to display on the client device as a response to the search query, wherein each of the plurality of carousels is horizontally scrollable and comprises content describing a plurality of items, wherein generating the plurality of carousels comprises:

computing a query relevance probability score for each of a plurality of items stored in an item database based on the search query, the stored user data, and item data describing the plurality of items, wherein the query relevance probability score for an item is a score representing a predicted likelihood that a user would interact with the item when the item is presented to the user in response to a search query from the user;

identifying a set of matching items from the plurality of items based on the computed query relevance probability scores for the plurality of items;

obtaining, from a hierarchical item taxonomy, a taxonomy category label for each matching item in the set of matching items, wherein the hierarchical item taxonomy relates each item in the item database to one of a plurality of taxonomy category labels;

grouping items from the set of matching items based on the taxonomy category labels obtained from the hierarchical item taxonomy, wherein the grouping produces a plurality of groups, and wherein each of the plurality of groups comprises items from the set of matching items that are associated with a branch within the hierarchical item taxonomy associated with the category label associated with the group; and generating a carousel for each of the plurality of groups, wherein a carousel for a group is a scrollable user interface element comprising items associated with the group arranged in a list;

automatically arrange the generated carousels into a scrollable list based on the stored user data to generate a user interface displaying the set of matching items, wherein the scrollable list is vertically scrollable and wherein automatically arranging the generated carousels comprises:

applying a machine-learned carousel model to the stored user data, item data describing the set of matching items, and the received search query to generate a score for each of the generated carousels, wherein a generated score for a carousel represents a predicted likelihood that the branch of the hierarchical item taxonomy is relevant to the search query, and automatically arranging the generated carousels based on the generated scores, wherein the generated carousels are automatically arranged such that generated carousels with generated scores indicating a higher predicted likelihood are arranged vertically-higher in the scrollable list than generated carousels with generated scores indicating a lower predicted likelihood; and send instructions for the user interface to the client device for display, wherein sending the instructions for the user interface to the client device causes the client device to automatically display the scrollable list of the plurality of carousels as results to the received search query, wherein the scrollable list of the plurality of carousels are displayed according to the automatic arrangement of the generated carousels, and wherein each of the generated carousels are displayed in the user interface with text describing the taxonomy category label associated with the generated carousel.

\*  \*  \*  \*  \*